United States Patent
Kim et al.

(10) Patent No.: US 11,137,644 B2
(45) Date of Patent: Oct. 5, 2021

(54) POLYMER FOR LIQUID CRYSTAL ALIGNING AGENT, LIQUID CRYSTAL ALIGNING AGENT COMPOSITION COMPRISING THE SAME, AND LIQUID CRYSTAL ALIGNING FILM AND LIQUID CRYSTAL DISPLAY DEVICE USING THE SAME

(71) Applicant: LG CHEM, LTD., Seoul (KR)

(72) Inventors: Seongku Kim, Daejeon (KR); Hee Han, Daejeon (KR); Jung Ho Jo, Daejeon (KR); Sung Joon Min, Daejeon (KR); Soon Ho Kwon, Daejeon (KR); Jun Young Yoon, Daejeon (KR); Hyeongseuk Yun, Daejeon (KR); Hoonseo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/500,676

(22) PCT Filed: Aug. 16, 2018

(86) PCT No.: PCT/KR2018/009404
§ 371 (c)(1),
(2) Date: Oct. 3, 2019

(87) PCT Pub. No.: WO2019/039791
PCT Pub. Date: Feb. 28, 2019

(65) Prior Publication Data
US 2020/0040258 A1    Feb. 6, 2020

(30) Foreign Application Priority Data
Aug. 24, 2017 (KR) .................... 10-2017-0107525

(51) Int. Cl.
G02F 1/1337 (2006.01)
C08G 73/10 (2006.01)
C08J 5/18 (2006.01)
C09K 19/56 (2006.01)

(52) U.S. Cl.
CPC ... *G02F 1/133723* (2013.01); *C08G 73/1025* (2013.01); *C08G 73/1078* (2013.01); *C08J 5/18* (2013.01); *C09K 19/56* (2013.01); *G02F 1/133788* (2013.01); *C08J 2379/08* (2013.01); *C09K 2323/027* (2020.08)

(58) Field of Classification Search
CPC ............ C08G 73/1025; C08G 73/1078; C08G 79/08; C08J 2379/08; C08L 79/08; C09K 2323/027; G02F 1/133723; G02F 1/133788
See application file for complete search history.

(56) References Cited

U.S. PATENT DOCUMENTS

| 6,013,760 A * | 1/2000 | Choi ............... C08G 73/10 528/353 |
|---|---|---|
| 10,982,147 B2 | 4/2021 | Kim et al. |
| 2002/0133005 A1 | 9/2002 | Iino et al. |
| 2005/0188480 A1 | 9/2005 | Lim et al. |
| 2007/0112134 A1 | 5/2007 | Seto |
| 2008/0113889 A1 | 5/2008 | Ruhe et al. |
| 2014/0255710 A1 | 9/2014 | Oishi et al. |
| 2015/0045481 A1 | 2/2015 | Kim et al. |
| 2015/0056544 A1 | 2/2015 | Miyake et al. |
| 2018/0028242 A1 | 2/2018 | Parekh et al. |

FOREIGN PATENT DOCUMENTS

| CN | 102604653 A | 7/2012 |
|---|---|---|
| CN | 105348180 A | 2/2016 |
| CN | 106479518 A | 3/2017 |
| EP | 3196228 A1 | 7/2017 |
| JP | 4609691 B2 | 1/2011 |
| JP | 2012-150251 A | 8/2012 |
| JP | 2015-040950 A | 3/2015 |
| JP | 2015-215591 A | 12/2015 |
| JP | 2015215591 A * | 12/2015 |
| JP | 2017-088801 A | 5/2017 |
| KR | 10-2008-0063148 A | 7/2008 |
| KR | 10-2008-0073235 A | 8/2008 |
| KR | 10-2011-0055384 A | 5/2011 |
| KR | 10-2011-0088394 A | 8/2011 |
| KR | 10-2012-0084253 A | 7/2012 |
| KR | 20120084253 A * | 7/2012 |
| KR | 10-2013-0079141 A | 7/2013 |

(Continued)

OTHER PUBLICATIONS

Kurita et al., Heat-Resistant Polymers Containing Bipyridyl Units. I. Polyimides, Journal of Polymer Science, Polymer Chemistry Edition, vol. 11, pp. 3125-3150. (Year: 1973).*
International Search Report & Written Opinion issued for International Application No. PCT/KR2018/005505 dated Sep. 11, 2018, 10 pages.
Guan, Y. etc., "Highly refractive polyimides containing pyridine and sulfur units: synthesis and thermal, mechanical, solubility and optical properties", Polymer International, Apr. 3, 2017, 66, pp. 1044-1054.

(Continued)

*Primary Examiner* — Sophie Hon
(74) *Attorney, Agent, or Firm* — Rothwell, Figg, Ernst & Manbeck, P.C.

(57) ABSTRACT

The present invention relates to a polymer which is excellent in terms of liquid crystal alignment property, durability, and electrical characteristics, and thus is suitable for use in a liquid crystal aligning agent, a liquid crystal aligning agent composition including the same, a liquid crystal alignment film formed from the liquid crystal aligning agent composition, and a liquid crystal display device including the liquid crystal alignment film.

14 Claims, No Drawings

(56) References Cited

FOREIGN PATENT DOCUMENTS

| KR | 10-2013-0103023 | A | | 9/2013 |
|---|---|---|---|---|
| KR | 10-2014-0027550 | A | | 3/2014 |
| KR | 10-2014-0051405 | A | | 4/2014 |
| KR | 10-2016-0140825 | A | | 12/2016 |
| KR | 10-2017-0030045 | A | | 3/2017 |
| KR | 10-2019-0021977 | A | | 3/2019 |
| KR | 101980637 | B1 | * | 5/2019 |
| TW | 201231505 | A | | 8/2012 |
| TW | 201837082 | A | | 10/2018 |
| WO | 2017-043822 | A1 | | 3/2017 |

OTHER PUBLICATIONS

Jong-Mo Jung and Doo-Kyang Yang, "Structural Analysis of Polyimide: Hydrolysis and Reaction-type Pyrolysis Application", Polymer Science and Technology vol. 16, No. 1, Feb. 2005, along with English abstract, 9 pages.

International Search Report & Written Opinion issued for International Application No. PCT/KR2018/009404 dated Jan. 17, 2019, 10 pages.

Examination Report dated Feb. 16, 2021 in the Japanese counterpart Application No. JP 2019-549416, along with machine English translation, 8 pages.

Written Opinion submitted in the Japanese counterpart Application No. 2019-549416 dated May 6, 2021, along with machine translation, 17 pages.

* cited by examiner

POLYMER FOR LIQUID CRYSTAL ALIGNING AGENT, LIQUID CRYSTAL ALIGNING AGENT COMPOSITION COMPRISING THE SAME, AND LIQUID CRYSTAL ALIGNING FILM AND LIQUID CRYSTAL DISPLAY DEVICE USING THE SAME

CROSS-REFERENCE TO RELATED APPLICATION(S)

This application is a 35 U.S.C. 371 National Phase Entry Application from PCT/KR2018/009404, filed Aug. 16, 2018, which claims priority to and the benefits of Korean Patent Application No. 10-2017-0107525 filed with the Korean Intellectual Property Office on Aug. 24, 2017, the disclosures of which are incorporated herein by reference in their entirety.

TECHNICAL FIELD

The present invention relates to a polymer which is excellent in terms of liquid crystal alignment property, and durability and electrical characteristics, and thus is suitable for use in a liquid crystal aligning agent, a liquid crystal aligning agent composition including the same, a liquid crystal alignment film formed from the liquid crystal aligning agent composition, and a liquid crystal display device including the liquid crystal alignment film.

BACKGROUND ART

In order to obtain uniform brightness and a high contrast ratio in a liquid crystal display device, it is essential to uniform align liquid crystals. A liquid crystal aligning agent acts as a director in the arrangement of liquid crystal molecules, and makes it possible to orient in an appropriate direction when the liquid crystals are moved due to an electric field to form an image.

As a conventional liquid crystal aligning agent, a polyimide, a polyamide, a polyester, or the like are widely known. Among them, in particular, since a polyimide has excellent heat resistance, affinity of liquid crystals, mechanical strength, and the like, it has been used in many liquid crystal display devices.

However, recently, as the demand for low-power displays has increased, it has been discovered that liquid crystal aligning agents can affect not only the fundamental properties of the alignment of liquid crystal but also electrical characteristics such as after-image or voltage holding ratio caused by a DC/AC voltage. Accordingly, there is an increasing need to develop liquid crystal alignment materials capable of realizing excellent liquid crystal alignment properties and electrical characteristics at the same time.

For this purpose, various attempts have been made to improve physical/chemical properties of the liquid crystal aligning agent by changing the structure of the liquid crystal aligning agent, for example, through a method of modifying a monomer used in the production of the liquid crystal aligning agent, a method of combining a plurality of different monomers, or the like, but remarkably improved physical properties have not yet been achieved.

Therefore, there is a need to develop a new liquid crystal aligning agent having an excellent liquid crystal alignment property, durability, and electrical characteristics.

DETAILED DESCRIPTION OF THE INVENTION

Technical Problem

It is an object of the present invention to provide a polymer which is excellent in liquid crystal alignment property, durability, and electrical characteristics, and thus is suitable for use in a liquid crystal aligning agent.

It is another object of the present invention to provide a liquid crystal aligning agent composition, a liquid crystal alignment film, and a liquid crystal display device, using the above-mentioned polymer for a liquid crystal aligning agent.

Technical Solution

In order to achieve the above objects, the present invention provides a polymer for a liquid crystal aligning agent including at least one selected from the group consisting of a repeating unit represented by the following Chemical Formula 1, a repeating unit represented by the following Chemical Formula 2, and a repeating unit represented by the following Chemical Formula 3.

[Chemical Formula 1]

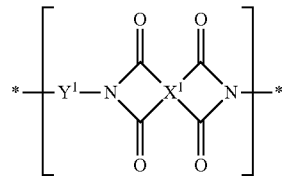

[Chemical Formula 2]

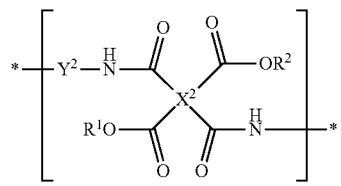

[Chemical Formula 3]

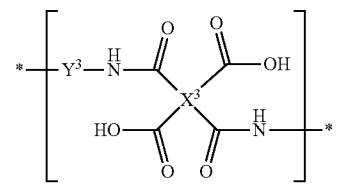

In Chemical Formulae 1 to 3, at least one of $R^1$ and $R^2$ is an alkyl group having 1 to 10 carbon atoms and the other is hydrogen, $X^1$ to $X^3$ are each independently a tetravalent organic group, and $Y^1$ to $Y^3$ are each independently a divalent organic group represented by the following Chemical Formula 4,

[Chemical Formula 4]

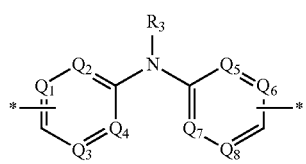

wherein, in Chemical Formula 4, at least one of $Q_1$ to $Q_4$ is nitrogen and the rest are carbon, at least one of $Q_5$ to $Q_8$ is nitrogen and the rest are carbon, and $R_3$ is hydrogen or an alkyl group having 1 to 6 carbon atoms.

Hereinafter, a polymer for a liquid crystal aligning agent according to an embodiment of the present invention, and a method for preparing the same, will be described in more detail.

Throughout the specification, when one part "includes" one constituent element, unless otherwise specifically described, this does not mean that another constituent element is excluded, but means that another constituent element may be further included.

As used herein, the term "substituted" means that a hydrogen atom bonded to a carbon atom in a compound is replaced with another substituent, and a position to be substituted is not limited as long as the position is a position at which the hydrogen atom is substituted, that is, a position at which the substituent can be substituted, and when two or more are substituted, the two or more substituents may be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; an amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked.

In the present specification, the notation

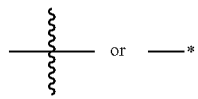

means a bond linked to another substituent group, and the direct bond means a case in which no separate atom is present at a part represented by L.

In the present specification, the alkyl group may be straight-chained or branched, and the number of carbon atoms thereof is not particularly limited, but is preferably 1 to 10. According to another exemplary embodiment, the number of carbon atoms of the alkyl group is 1 to 6. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cycloheptylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 4-methylhexyl, 5-methylhexyl, and the like, but are not limited thereto.

The fluoroalkyl group having 1 to 10 carbon atoms may be a group in which at least one hydrogen in the alkyl group having 1 to 10 carbon atoms is substituted with fluorine, and the fluoroalkoxy group having 1 to 10 carbon atoms may be a group in which at least one hydrogen in the alkoxy group having 1 to 10 carbon atoms is substituted with fluorine.

The halogen may be fluorine (F), chlorine (Cl), bromine (Br), or iodine (I).

The nitrogen oxide is a compound in which a nitrogen atom and an oxygen atom are bonded, and the nitrogen oxide functional group means a functional group containing a nitrogen oxide in the functional group. As an example of the nitrogen oxide functional group, a nitro group ($-NO_2$) or the like can be used.

Polymer for Liquid Crystal Aligning Agent

The present inventors found through experiments that when a polymer for a liquid crystal aligning agent including the repeating units of Chemical Formulae 1 to 3 prepared from a reactant containing a diamine compound having a specific structure is used, it is possible to have an excellent liquid crystal alignment property and a high voltage holding ratio at a high temperature, and to improve degradation of a contrast ratio or an after-image phenomenon, thereby completing the present invention.

Specifically, according to one embodiment of the invention, a polymer for a liquid crystal aligning agent including at least one repeating unit selected from the group consisting of a repeating unit represented by Chemical Formula 1, a repeating unit represented by Chemical Formula 2, and a repeating unit represented by Chemical Formula 3 can be provided.

That is, the polymer for a liquid crystal aligning agent may include one kind of the repeating unit represented by Chemical Formula 1, one kind of the repeating unit represented by Chemical Formula 2, one kind of the repeating unit represented by Chemical Formula 3, or a mixture of two or more thereof.

In particular, the $Y^1$ to $Y^3$ are each defined as a divalent organic group represented by the following Chemical Formula 4, which can provide a polymer for a liquid crystal aligning agent having various structures capable of exhibiting the above-described effects.

[Chemical Formula 4]

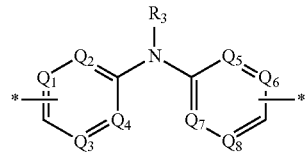

In Chemical Formula 4, at least one of $Q_1$ to $Q_4$ is nitrogen and the rest are carbon, at least one of $Q_5$ to $Q_8$ is nitrogen and the rest are carbon, and $R_3$ is hydrogen or an alkyl group having 1 to 6 carbon atoms.

The functional group represented by Chemical Formula 4 has a structural characteristic in which two aromatic cyclic compounds, preferably heteroaromatic cyclic compounds, are bonded via a secondary amine group or a tertiary amine group. Thereby, even while satisfying the same or a higher level of alignment and after-image characteristics as a liquid crystal aligning agent, the voltage holding ratio is improved to 94% or more so excellent electrical characteristics can be realized.

On the other hand, when two aromatic cyclic compounds are bonded by a single bond without a secondary amine group or a tertiary amine group, there may be technical problems that the alignment property of the liquid crystal aligning agent is poor and the voltage holding ratio is decreased to less than 80%.

In addition, when neither of the two aromatic cyclic compounds bonded through a secondary amine group or a tertiary amine group contain a nitrogen atom, a sufficient imidization reaction cannot proceed (for example, through a heat treatment at 230° C.) even if the imidization reaction proceeds on the polyamic acid or the polyamic acid ester formed by the reaction between the amine and the acid anhydride. Thus, there is a limitation in that the imidization rate decreases in the final liquid crystal alignment film. This appears to be due to the difference in physical and chemical properties of the amine, polyamic acid, and polyamic acid ester caused by the difference in the structure of the amine compound.

Specifically, in Chemical Formula 4, one of $Q_1$ to $Q_4$ may be nitrogen and the rest may be carbon, and one of $Q_5$ to $Q_8$ may be nitrogen and the rest may be carbon. More specifically, in $Q_1$ to $Q_4$ of Chemical Formula 4, one of $Q_2$ and $Q_4$ may be nitrogen and the other may be carbon, and $Q_1$ and $Q_3$ may be carbon. Further, in $Q_5$ to $Q_8$ of Chemical Formula 4, one of $Q_5$ and $Q_7$ may be nitrogen and the other may be carbon, and $Q_6$ and $Q_8$ may be carbon.

Preferably, in $Q_1$ to $Q_4$ of Chemical Formula 4, one of $Q_2$ and $Q_4$ may be nitrogen and the other may be carbon, and $Q_1$ and $Q_3$ may be carbon. Simultaneously, in $Q_5$ to $Q_8$ of Chemical Formula 4, one of $Q_5$ and $Q_7$ may be nitrogen and the other may be carbon, and $Q_6$ and $Q_8$ may be carbon.

That is, Chemical Formula 4 may have a structure in which a pyridine compound where one of the six carbons of benzene is substituted by nitrogen is asymmetrically bonded through a secondary amine or a tertiary amine. Accordingly, the liquid crystal display device to which the polymer for a liquid crystal aligning agent of one embodiment is applied can realize a high voltage holding ratio and liquid crystal alignment property.

On the other hand, in Chemical Formula 4, when one of $Q_1$ and $Q_3$ is nitrogen, or one of $Q_6$ and $Q_8$ is nitrogen, there may be a problem that the electrical characteristic and long-term reliability of the prepared alignment film gradually decreases.

Further, in Chemical Formula 4, $R_3$ may be hydrogen.

Chemical Formula 4 is a repeating unit derived from a diamine, which is a precursor used for forming a polymer for a liquid crystal aligning agent, and is considered to result from the use of an asymmetric pyridine-based diamine as described below.

In view of the fact that the structure of an asymmetric pyridine diamine or the repeating unit derived therefrom and the effects resulting therefrom have never been recognized in the field of the polymer for the liquid crystal aligning agent previously known in the art, the repeating unit of Chemical Formula 4 and the diamine compound which is a precursor thereof are considered to be novel.

In addition, Chemical Formula 4 may include a functional group represented by the following Chemical Formula 4-1 or Chemical Formula 4-2.

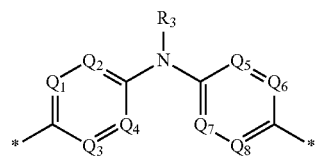

[Chemical Formula 4-1]

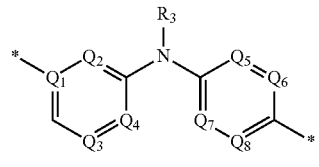

[Chemical Formula 4-2]

In Chemical Formulae 4-1 and 4-2, the definitions of $Q_1$ to $Q_8$ and $R_3$ include those described above in Chemical Formula 4.

As such, as Chemical Formula 4 includes a functional group represented by Chemical Formula 4-1 or Chemical Formula 4-2, the liquid crystal display device to which the polymer for the liquid crystal aligning agent of one embodiment is applied can realize a high voltage holding ratio and liquid crystal alignment property.

More specifically, Chemical Formula 4 may include a functional group represented by the following Chemical Formula 4-3 or Chemical Formula 4-4.

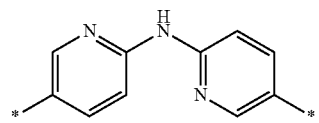

[Chemical Formula 4-3]

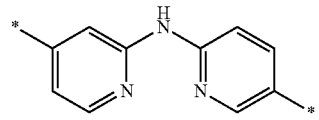

[Chemical Formula 4-4]

Meanwhile, the $X^1$ to $X^3$ may each independently be a tetravalent organic group represented by the following Chemical Formula 5.

[Chemical Formula 5]

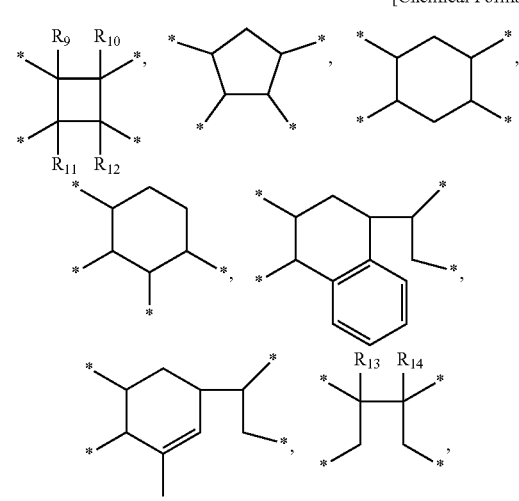

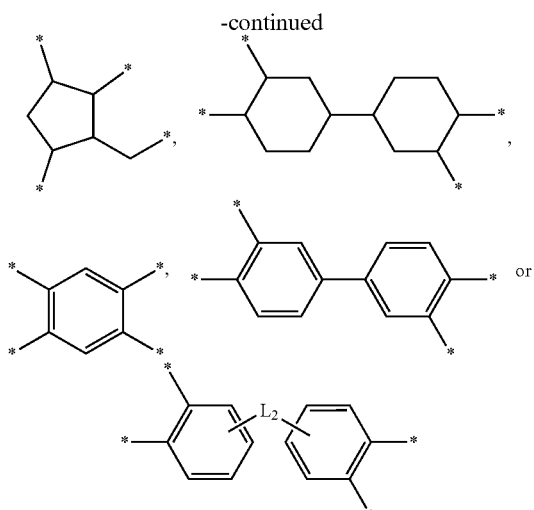

In Chemical Formula 5, $R_9$ to $R_{14}$ are each independently hydrogen or an alkyl group having 1 to 10 carbon atoms, and $L_2$ is any one selected from the group consisting of a direct bond, —O—, —CO—, —S—, —SO—, —SO$_2$—, —CR$_{15}$R$_{16}$—, —CONH—, —COO—, —(CH$_2$)$_b$—, —O(CH$_2$)$_b$O—, —COO—(CH$_2$)$_b$—OCO—, phenylene, or a combination thereof, wherein the $R_{15}$ and $R_{16}$ are each independently hydrogen, an alkyl group having 1 to 10 carbon atoms, or a fluoroalkyl group having 1 to 10 carbon atoms, and b is an integer of 1 to 10. More preferably, $X^1$ to $X^3$ are each independently an organic group of the following Chemical Formula 5-1 derived from cyclobutane-1,2,3,4-tetracarboxylic dianhydride, an organic group of the following Chemical Formula 5-2 derived from 1,3-dimethylcyclobutane-1,2,3,4-tetracarboxylic dianhydride, or an organic group of the following Chemical Formula 5-3 derived from tetrahydro-[3,3'-bifuran]-2,2',5,5'-tetraone.

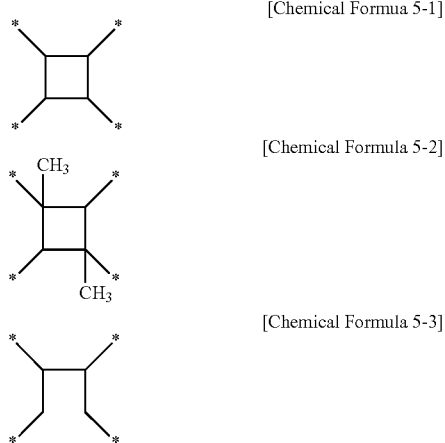

Among the repeating units represented by Chemical Formula 1, Chemical Formula 2, and Chemical Formula 3, the polymer may include 0 mol % to 80 mol %, or 0.1 mol % to 65 mol %, of the repeating unit represented by Chemical Formula 1 which is an imide repeating unit, based on the total repeating units.

As described above, when the polymer containing a specific content of the imide repeating unit represented by Chemical Formula 1 is used, the polymer contains a specific content of the imide repeating unit which has been previously imidized. Therefore, although a high-temperature heat treatment step is omitted and light irradiation is immediately performed, it is possible to produce a liquid crystal alignment film with an excellent alignment property and stability.

If the repeating unit represented by Chemical Formula 1 is included in an amount below the range, a sufficient alignment property may not be obtained, and alignment stability may be deteriorated. If the repeating unit represented by Chemical Formula 1 is included in an amount above the range, there is a problem that solubility may be lowered, and thus it is difficult to prepare a stable alignment solution which can be coated. Accordingly, it is preferable that the repeating unit represented by Chemical Formula 1 is included in an amount within the above range, in terms of providing a polymer for liquid crystal alignment which is excellent in storage stability, electrical property, alignment property, and alignment stability.

Further, the repeating unit represented by Chemical Formula 2 or the repeating unit represented by Chemical Formula 3 may be included in an appropriate amount depending on desired properties.

Specifically, the repeating unit represented by Chemical Formula 2 may be included in an amount of 0 mol % to 50 mol %, preferably 0.1 mol % to 30 mol %, based on a total of the repeating units represented by Chemical Formulae 1 to 3. A conversion rate of the repeating unit represented by Chemical Formula 2 to imide is low during the high-temperature heat treatment step after light irradiation, and therefore, if its content exceeds the above range, the overall imidization rate is insufficient and the alignment stability may be lowered. Accordingly, when the repeating unit represented by Chemical Formula 2 is used within the above range, it exhibits proper solubility, thereby providing a polymer for liquid crystal alignment capable of achieving a high imidization rate while having an excellent process property.

Further, the repeating unit represented by Chemical Formula 3 may be included in an amount of 10 mol % to 100 mol %, or 30 mol % to 99.8 mol %, based on a total of the repeating units represented by Chemical Formulae 1 to 3. When the repeating unit represented by Chemical Formula 3 is used within the above range, it shows an excellent coating property, thereby providing a polymer for liquid crystal alignment capable of achieving a high imidization rate while having an excellent process property.

The weight average molecular weight of the polymer for liquid crystal aligning agent may be 100 g/mol to 200,000 g/mol, or 100 g/mol to 10,000 g/mol. The weight average molecular weight means a weight average molecular weight in terms of polystyrene measured by a GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions include a temperature of 30° C., a chloroform solvent, and a flow rate of 1 mL/min.

Such a polymer can be used as a liquid crystal aligning agent to provide a liquid crystal alignment film which realizes excellent stability and reliability.

Examples of the method for preparing the polymer for a liquid crystal aligning agent are not particularly limited, and for example, a method including the steps of: reacting a heteroaromatic compound of the following Chemical Formula 6 with a heteroaromatic compound of Chemical Formula 7 to prepare a compound of the following Chemical Formula 8; reducing the compound of Chemical Formula 8 to prepare a diamine of the following Chemical Formula 9; and reacting the diamine of Chemical Formula 9 with a tetracarboxylic acid or an anhydride thereof to prepare a polymer for a liquid crystal aligning agent, can be used.

[Chemical Formula 6]

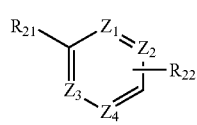

In Chemical Formula 6, $R_{21}$ is a halogen atom, $R_{22}$ is a nitrogen oxide functional group, and
at least one of $Z_1$ to $Z_4$ is nitrogen and the rest are carbon.

[Chemical Formula 7]

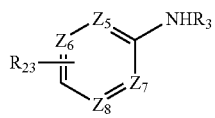

In Chemical Formula 7, $R_3$ is hydrogen or an alkyl group having 1 to 10 carbon atoms, $R_{23}$ is an amino group or a nitrogen oxide functional group, and at least one of $Z_5$ to $Z_8$ is nitrogen and the rest are carbon.

[Chemical Formula 8]

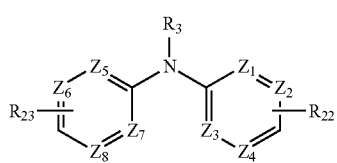

[Chemical Formula 9]

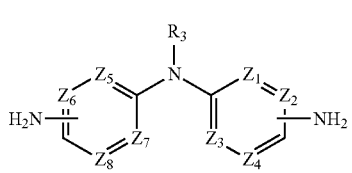

Preferably, in Chemical Formula 6, $R_{21}$ is a chlorine atom, $R_{22}$ is a nitro group, one of $Z_1$ and $Z_3$ is nitrogen and the other is carbon, and $Z_2$ and $Z_4$ may be carbon. That is, preferred examples of Chemical Formula 6 include 2-chloro-5-nitropyridine, 2-chloro-4-nitropyridine, or the like.

Meanwhile, in Chemical Formula 7, one of $Z_5$ and $Z_7$ is nitrogen and the other is carbon, $Z_6$ and $Z_8$ are carbon, $R_3$ is hydrogen, and $R_{23}$ may be a nitro group. That is, preferred examples of Chemical Formula 7 include 5-nitropyridin-2-amine and the like.

Specifically, in the step of preparing the compound of Chemical Formula 8, the compound of Chemical Formula 8 can be prepared by reacting the heteroaromatic compound of Chemical Formula 6 with the heteroaromatic compound of Chemical Formula 7. Specifically, a reaction in which the halogen element of $R_{21}$ included in the heteroaromatic compound of Chemical Formula 6 is substituted with a nitrogen element contained in the heteroaromatic compound of Chemical Formula 7 can be carried out.

The reaction may be carried out under conditions of being proceeded in the presence of a tertiary amine catalyst at 50° C. to 150° C. for 10 to 20 hours. The reaction can be carried out in the presence of various organic solvents previously known in the art, and specific examples of the organic solvent include ethyl acetate, tetrahydrofuran, N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, or the like. These solvents may be used alone or in combination.

In the nitrogen oxide functional group, the nitrogen oxide is a compound in which a nitrogen atom and an oxygen atom are bonded, and the nitrogen oxide functional group means a functional group containing a nitrogen oxide in the functional group. As an example of the nitrogen oxide functional group, a nitro group (—$NO_2$) or the like can be used.

The compound of Chemical Formula 8 thus prepared can be subjected to a reduction reaction to prepare a diamine compound of Chemical Formula 9. Specifically, as the nitrogen oxide functional group of $R_{22}$ or $R_{23}$ contained in the compound of Chemical Formula 8 is reduced under reducing conditions to a primary amino group, a diamine compound can be synthesized.

The reduction reaction may be carried out under mild conditions of being proceeded in the presence of a palladium/carbon catalyst at room temperature for 10 to 15 hours. The reaction may be carried out in the presence of various organic solvents previously known in the art, and specific examples of the organic solvent include ethyl acetate, tetrahydrofuran, N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, and the like. These solvents may be used alone or in combination.

The details of $Z_1$ to $Z_8$, $R_3$, $R_{22}$, and $R_{23}$ described in Chemical Formulae 8 and 9 include those described above in Chemical Formulae 6 and 7.

Specific examples of the compound of Chemical Formula 9 include a compound represented by the following Chemical Formula 9-1 or 9-2.

[Chemical Formula 9-1]

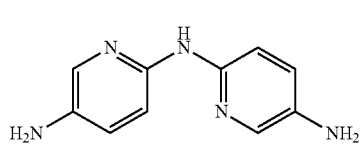

-continued

[Chemical Formula 9-2]

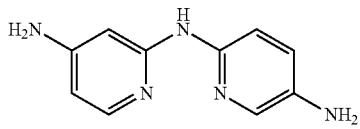

The diamine of Chemical Formula 9 prepared through the above steps can be reacted with a tetracarboxylic acid or its anhydride commonly used in the preparation of polyamic acids, for example, pyromellitic dianhydride, 3,3',4,4'-biphenyltetracarboxylic dianhydride, or cyclobutane-1,2,3,4-tetracarboxylic dianhydride, or 1,3-dimethylcyclobutane-1,2,3,4-tetracarboxylic dianhydride, tetrahydro-[3,3'-bifuran]-2,2',5,5'-tetraone, or the like to prepare a polymer including amic acid, an amic acid ester, or a mixture thereof.

Alternatively, if necessary, in addition to the diamine of Chemical Formula 9 prepared through the above steps, various kinds of diamine compounds commonly known in the field relevant to liquid crystal aligning agents, for example, p-phenylenediamine, 4,4-oxydianiline, 4,4'-methylenedianiline, and the like can be mixed to prepare the amic acid, amic acid ester, or a mixture thereof.

The reaction conditions can be appropriately adjusted with reference to the preparation conditions of polyamic acid known in the art.

Meanwhile, according to another embodiment of the invention, a liquid crystal aligning agent composition including the above-mentioned polymer is provided.

Such a liquid crystal aligning agent composition may be provided through various methods known in the art, except that it includes the above-mentioned polymer.

As a non-limiting example, the above-mentioned polymer may be dissolved or dispersed in an organic solvent to provide a liquid crystal aligning agent composition.

Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, and the like. These solvents can be used alone or in combination.

In addition, the liquid crystal aligning agent composition may further include other components in addition to the polymer and the organic solvent. In a non-limiting example, when the liquid crystal aligning agent composition is coated, additives capable of improving the uniformity of the thickness of a film and the surface smoothness, improving the adhesion between a liquid crystal alignment film and a substrate, or changing the dielectric constant and conductivity of a liquid crystal alignment film or increasing the denseness of a liquid crystal alignment film, may be further included. Examples of these additives include various kinds of solvents, surfactants, silane-based compounds, dielectrics, crosslinking compounds, etc.

Method for Preparing Liquid Crystal Alignment Film

In addition, the present invention provides a method for preparing a liquid crystal alignment film including the steps of: coating the liquid crystal aligning agent composition onto a substrate to form a coating film (step 1); drying the coating film (step 2); irradiating the coating film immediately after the drying step with light or rubbing the coating film to perform alignment treatment (step 3); and heat-treating and curing the alignment-treated coating film (step 4).

Step 1 is a step of coating the above-mentioned liquid crystal aligning agent composition onto a substrate to form a coating film.

The method of coating the liquid crystal aligning agent composition onto a substrate is not particularly limited, and for example, a method such as screen printing, offset printing, flexographic printing, inkjet printing, and the like can be used.

Further, the liquid crystal aligning agent composition may be that dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. These solvents can be used alone or in combination.

In addition, the liquid crystal aligning agent composition may further include other components in addition to the organic solvent. In a non-limiting example, when the liquid crystal aligning agent composition is coated, additives capable of improving the uniformity of the thickness of a film and the surface smoothness, or improving the adhesion between a liquid crystal alignment film and a substrate, or changing the dielectric constant and conductivity of a liquid crystal alignment film or increasing the denseness of a liquid crystal alignment film, may be further included. Examples of these additives include various kinds of solvents, surfactants, silane-based compounds, dielectrics, crosslinking compounds, etc.

Step 2 is a step of drying the coating film formed by coating the liquid crystal aligning agent composition onto a substrate.

The step of drying the coating film may be performed by using a method such as heating of a coating film or vacuum evaporation, and is preferably performed at 50° C. to 150° C., or 60° C. to 140° C.

Step 3 is a step of irradiating the coating film immediately after the drying step with light or rubbing the coating film to perform alignment treatment.

In the present specification, the "irradiating the coating film immediately after the drying step" refers to irradiating the film with a light immediately after the drying without carrying out a heat treatment at a temperature higher than that of the drying step, and steps other than the heat treatment can be added.

More specifically, when a liquid crystal alignment film is prepared by using a conventional liquid crystal aligning agent including polyamic acid or polyamic acid ester, it includes a step of irradiating light after essentially performing a high-temperature heat treatment for imidization of polyamic acid. However, when a liquid crystal alignment film is prepared using the liquid crystal aligning agent of the one embodiment described above, it does not include the heat treatment step, and light is directly irradiated to perform alignment treatment, and then the alignment-treated coating film is cured by a heat treatment, thereby being capable of preparing a liquid crystal alignment film.

Further, in the alignment treatment step, the light irradiation may be performed by irradiating polarized ultraviolet rays having a wavelength of 150 nm to 450 nm. In this case, the intensity of the light exposure may vary depending on the kind of the polymer for a liquid crystal aligning agent, and preferably energy of 10 mJ/cm$^2$ to 10 J/cm$^2$, or 30 mJ/cm$^2$ to 2 J/cm$^2$, may be irradiated.

As for the ultraviolet rays, polarized ultraviolet rays selected among the ultraviolet rays subjected to polarization treatment by a method of passing through or reflecting by a polarizing device using a substrate in which a dielectric anisotropic material is coated onto the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays may be irradiated perpendicularly to the surface of the substrate, or may be irradiated by directing an angle of incidence toward a specific angle. By this method, the alignment ability of the liquid crystal molecules is imparted to the coating film.

Further, in the alignment treatment step, a rubbing treatment can employ a method using a rubbing cloth. More specifically, in the rubbing treatment, the surface of the coating film after the heat treatment step can be rubbed in one direction while rotating a rubbing roller of which a rubbing cloth is attached to a metal roller.

Step 4 is a step of heat-treating and curing the alignment-treated coating film.

The step of heat-treating and curing the alignment-treated coating film is a step that is performed after light irradiation even in the conventional method of preparing a liquid crystal alignment film using a polymer for a liquid crystal aligning agent containing a polyamic acid or a polyamic acid ester, and is distinguished from a heat treatment step that is performed by coating the liquid crystal aligning agent composition onto a substrate and then performing imidization of the liquid crystal aligning agent before irradiating the light or while irradiating the light.

In this case, the heat treatment may be performed by a heating means such as a hot plate, a hot-air circulation furnace, an infrared furnace, and the like, and the heat treatment is preferably performed at a temperature of 150° C. to 300° C., or 180° C. to 250° C.

Meanwhile, the method may further include heat-treating the coating film immediately after the drying step at a temperature equal to or higher than that of the drying step, if necessary, after a step of drying the coating film (step 2). The heat treatment may be performed by a heating means such as a hot plate, a hot-air circulation furnace, and an infrared furnace, and is preferably carried out at a temperature of 150° C. to 250° C. In this process, the liquid crystal aligning agent can be imidized.

That is, the method for preparing a liquid crystal alignment film may include the steps of: coating the above-mentioned liquid crystal aligning agent composition onto a substrate to form a coating film (step 1); drying the coating film (step 2); heat-treating the coating film immediately after the drying step at a temperature equal to or higher than that of the drying step (step 3), irradiating the heat-treated coating film with light or rubbing the coating film to perform alignment treatment (step 4); and heat-treating and curing the alignment-treated coating film (step 5).

Liquid Crystal Alignment Film

Further, the present invention may provide a liquid crystal alignment film prepared in accordance with the method for preparing a liquid crystal alignment film described above.

As described above, when a liquid crystal aligning agent composition containing a polymer for a liquid crystal aligning agent including at least one repeating unit selected from the group consisting of a repeating unit represented by Chemical Formula 1, a repeating unit represented by Chemical Formula 2, and a repeating unit represented by Chemical Formula 3 is used, a liquid crystal alignment film having an excellent alignment property and electrical characteristics can be prepared.

Liquid Crystal Display Device

In addition, the present invention provides a liquid crystal display device including the liquid crystal alignment film described above.

The liquid crystal alignment film may be introduced into a liquid crystal cell by a known method, and likewise, the liquid crystal cell may be introduced into a liquid crystal display device by a known method. The liquid crystal alignment film can be prepared from the liquid crystal aligning agent composition of another embodiment, thereby achieving excellent stability together with excellent physical properties. Specifically, the liquid crystal display device which can have a high voltage holding ratio at a high temperature and a low frequency, has excellent electrical characteristics, reduces the performance degradation of a contrast ratio or an image sticking (after-image) phenomenon, and has excellent film strength can be provided.

Advantageous Effects

According to the present invention, a polymer for liquid crystal alignment having an excellent liquid crystal property, durability, and electrical characteristics, a method for preparing crystal aligning agent composition, and a preparation method thereof can be provided.

DETAILED DESCRIPTION OF THE EMBODIMENTS

The prevention invention will be described in more detail by way of examples. However, these examples are given for illustrative purposes only, and the scope of the invention is not intended to be limited by these examples.

Preparation Example: Preparation of Diamine

Preparation Example 1

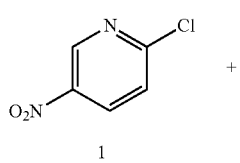

1

-continued

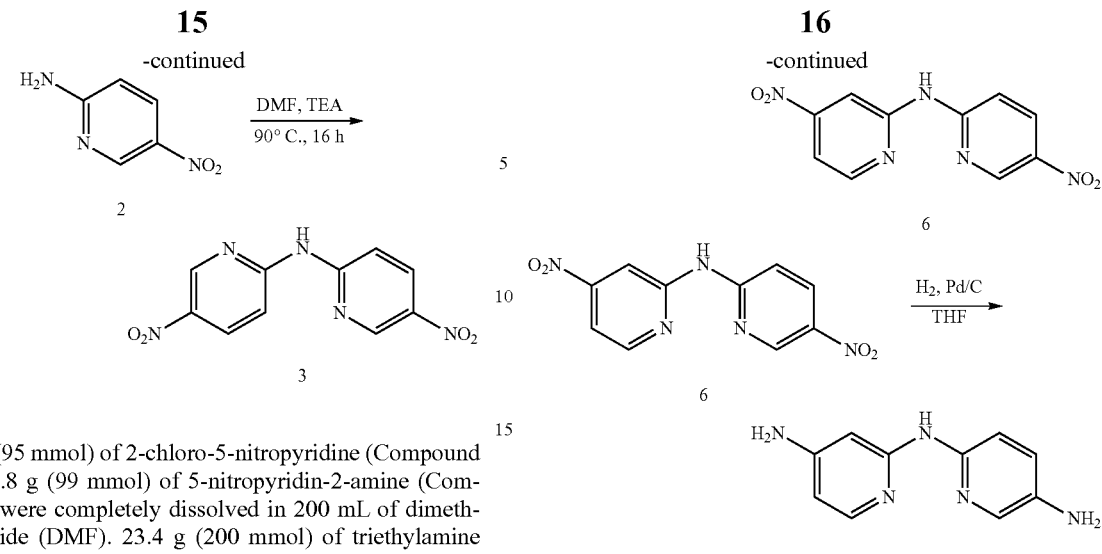

15.0 g (95 mmol) of 2-chloro-5-nitropyridine (Compound 1) and 13.8 g (99 mmol) of 5-nitropyridin-2-amine (Compound 2) were completely dissolved in 200 mL of dimethylformamide (DMF). 23.4 g (200 mmol) of triethylamine (TEA) was then added thereto and stirred at 90° C. for 16 hours. When the reaction was completed, the reaction product was poured into a container containing 500 mL of water and stirred for 1 hour. The solid obtained by filtration was washed with 200 mL of ultrapure water to synthesize 15 g (42.5 mmol) of Compound 3 (yield: 45%).

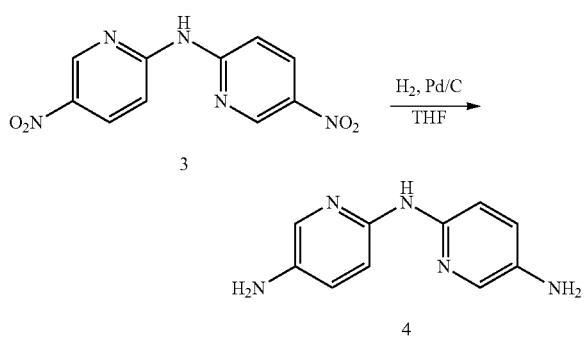

Compound 3 was dissolved in 200 mL of tetrahydrofuran (THF). 0.8 g of palladium (Pd)/carbon (C) was added thereto and stirred under a hydrogen atmosphere for 12 hours. After completion of the reaction, the reaction mixture was filtered through a celite pad and the filtrate was concentrated to prepare 9.0 g of a diamine of Preparation Example 1 (Compound 4) (yield: 60%).

Preparation Example 2

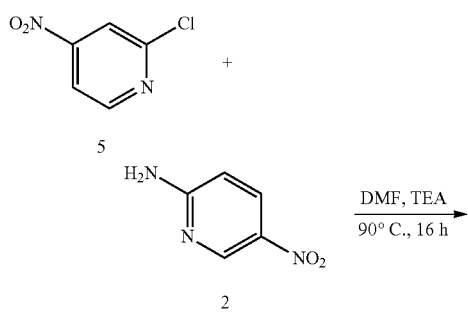

The diamine of Preparation Example 2 was prepared in the same manner as in Preparation Example 1, except that 2-chloro-4-nitropyridine (Compound 5) was used instead of 2-chloro-5-nitropyridine (Compound 7).

Synthesis Examples and Comparative Synthesis Examples: Synthesis of Polymer for Liquid Crystal Aligning Agent Synthesis Example 1: Polymer P-1 for Liquid Crystal Alignment 1.408 g (7 mmol) of the diamine prepared in Preparation Example 1 was completely dissolved in 15.37 g of anhydrous N-methyl pyrrolidone (NMP).
Then, 1.304 g (6.65 mmol) of cyclobutane-1,2,3,4-tetracarboxylic dianhydride (CBDA) was added to the solution under an ice bath and stirred at room temperature for 16 hours to prepare a polymer P-1 for liquid crystal alignment.

Synthesis Example 2: Polymer P-2 for Liquid Crystal Alignment

A polymer P-2 for liquid crystal alignment was prepared in the same manner as in Synthesis Example 1, except that the diamine prepared in Preparation Example 2 was used instead of the diamine prepared in Preparation Example 1.

Synthesis Example 3: Polymer P-3 for Liquid Crystal Alignment

A polymer P-3 for liquid crystal alignment was prepared in the same manner as in Synthesis Example 1, except that 1,3-dimethyl cyclobutane-1,2,3,4-tetracarboxylic dianhydride (DMCBDA) was used instead of cyclobutane-1,2,3,4-tetracarboxylic dianhydride (CBDA).

Synthesis Example 4: Polymer P-4 for Liquid Crystal Alignment

A polymer P-4 for liquid crystal alignment was prepared in the same manner as in Synthesis Example 2, except that 1,3-dimethyl cyclobutane-1,2,3,4-tetracarboxylic dianhydride (DMCBDA) was used instead of cyclobutane-1,2,3,4-tetracarboxylic dianhydride (CBDA).

Synthesis Example 5: Polymer P-5 for Liquid Crystal Alignment

A polymer P-5 for liquid crystal alignment was prepared in the same manner as in Synthesis Example 1, except that tetrahydro-[3,3'-bifuran]-2,2',5,5'-tetraone (BT100) was used instead of cyclobutane-1,2,3,4-tetracarboxylic dianhydride (CBDA).

Synthesis Example 6: Polymer P-6 for Liquid Crystal Alignment

A polymer P-6 for liquid crystal alignment was prepared in the same manner as in Synthesis Example 2, except that tetrahydro-[3,3'-bifuran]-2,2',5,5'-tetraone (BT100) was used instead of cyclobutane-1,2,3,4-tetracarboxylic dianhydride (CBDA).

Comparative Synthesis Example 1: Polymer R-1 for Liquid Crystal Alignment

A polymer R-1 for liquid crystal alignment was prepared in the same manner as in Synthesis Example 1, except that 6-(4-aminophenyl)pyridin-3-amine represented by the following Chemical Formula A was used instead of the diamine prepared in Preparation Example 1.

[Chemical Formula A]

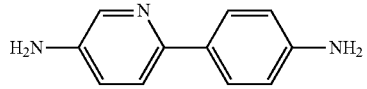

Comparative Synthesis Example 2: Polymer R-2 for Liquid Crystal Alignment

A polymer R-2 for liquid crystal alignment was prepared in the same manner as in Synthesis Example 1, except that 4,4'-diaminodiphenylamine represented by the following Chemical Formula B was used instead of the diamine prepared in Preparation Example 1.

[Chemical Formula B]

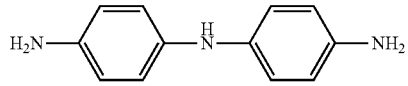

Examples and Comparative Examples: Preparation of Liquid Crystal Aligning Agent

Example 1

20 g of the polymer P-1 for a liquid crystal aligning agent of Synthesis Example 1 was dissolved in a mixed solvent of 8.65 g of NMP, 19.95 g of GBL and 11.4 g of 2-butoxyethanol to obtain a 5 wt % solution. Then, the obtained solution was subjected to pressure filtration through a filter having a pore size of 0.1 μm made of poly(tetrafluorene ethylene) to prepare a liquid crystal aligning agent A-1.

Example 2

A liquid crystal aligning agent A-2 was prepared in the same manner as in Example 1, except that the polymer P-2 for a liquid crystal aligning agent of Synthesis Example 2 was used instead of the polymer P-1 for a liquid crystal aligning agent of Synthesis Example 1.

Example 3

A liquid crystal aligning agent A-3 was prepared in the same manner as in Example 1, except that the polymer P-3 for a liquid crystal aligning agent of Synthesis Example 3 was used instead of the polymer P-1 for a liquid crystal aligning agent of Synthesis Example 1.

Example 4

A liquid crystal aligning agent A-4 was prepared in the same manner as in Example 1, except that the polymer P-4 for a liquid crystal aligning agent of Synthesis Example 4 was used instead of the polymer P-1 for a liquid crystal aligning agent of Synthesis Example 1.

Example 5

A liquid crystal aligning agent A-5 was prepared in the same manner as in Example 1, except that the polymer P-5 for a liquid crystal aligning agent of Synthesis Example 5 was used instead of the polymer P-1 for a liquid crystal aligning agent of Synthesis Example 1.

Example 6

A liquid crystal aligning agent A-6 was prepared in the same manner as in Example 1, except that the polymer P-6 for a liquid crystal aligning agent of Synthesis Example 6 was used instead of the polymer P-1 for a liquid crystal aligning agent of Synthesis Example 1.

Comparative Example 1

A liquid crystal aligning agent B-1 was prepared in the same manner as in Example 1, except that the polymer R-1 for a liquid crystal aligning agent of Comparative Synthesis Example 1 was used instead of the polymer P-1 for a liquid crystal aligning agent of Synthesis Example 1.

Comparative Example 2

A liquid crystal aligning agent B-2 was prepared in the same manner as in Example 1, except that the polymer R-2 for a liquid crystal aligning agent of Comparative Synthesis Example 2 was used instead of the polymer P-1 for a liquid crystal aligning agent of Synthesis Example 1.

Experimental Example: Measurement of Physical Properties of the Liquid Crystal Aligning Agents Obtained in the Examples and Comparative Examples A liquid crystal cell was prepared by using the liquid crystal aligning agents obtained in the examples and comparative examples. The physical properties of each liquid crystal alignment cell were measured by the following method, and the results are shown in Table 1 below.

Specifically, the liquid crystal aligning agent compositions prepared in the examples and comparative examples were coated onto each of the upper and lower substrates for the voltage holding ratio (VHR) in which an ITO electrode having a thickness of 60 nm and an area of 1 cm×1 cm was patterned on a rectangular glass substrate having a size of 2.5 cm×2.7 cm using a spin coating method. Then, the substrates onto which the liquid crystal aligning agent composition was coated were placed on a hot plate at about 80° C. and dried for 2 minutes to evaporate the solvent. In order to subject the thus-obtained coating film to alignment treatment, ultraviolet rays of 254 nm were irradiated with an intensity of 0.25 J/cm$^2$ using an exposure apparatus in which a linear polarizer was adhered to the coating film of each of the upper/lower plates. Subsequently, the alignment-treated upper/lower plates were calcinated (cured) in an oven at about 230° C. for 15 minutes to obtain a coating film having a thickness of 0.1 μm. Then, a sealing agent impregnated with ball spacers having a size of 4.5 μm was applied to the edge of the upper plate excluding the liquid crystal injection hole. Then, the alignment films formed on the upper plate and the lower plate were aligned such that they faced each other and the alignment directions were aligned with each other, and then the upper and lower plates were bonded together and the sealing agent was cured to prepare an empty space. Then, a liquid crystal was injected into the empty cells to prepare a liquid crystal alignment cell.

1) Evaluation of Liquid Crystal Alignment Properties

Polarizers were adhered to the upper and lower plates of the liquid crystal cell prepared above so as be perpendicular to each other. The liquid crystal cell to which the polarizing plates were adhered was then placed on a backlight with brightness of 7000 cd/m$^2$, and light leakage was observed with the naked eye. At this time, if the alignment properties of the liquid crystal alignment film are excellent and the liquid crystal is arranged well, light is not passed through the upper and lower polarizing plates adhered vertically to each other, and it is observed dark without defects. In this case, the alignment properties are evaluated as 'good', and when light leakage such as liquid crystal flow mark or bright spot is observed, it is evaluated as 'poor'. The results are shown in Table 1 below.

2) Voltage Holding Ratio (VHR)

For the liquid crystal alignment cells, the voltage holding ratio was measured at 1 Hz and 60° C. using 6254C equipment available from TOYO Corporation as a measuring instrument.

3) AC Afterimage

Polarizing plates were adhered to the upper plate and lower plate of the liquid crystal cell so as to be perpendicular to each other. The liquid crystal cell to which the polarizing plates were adhered was adhered onto a backlight of 7000 cd/m$^2$, and the brightness in a black mode was measured using a PR-880 equipment which is a device for measuring the brightness. Then, the liquid crystal cell was driven at room temperature for 24 hours with an AC voltage of 5 V. Thereafter, the brightness in a black mode was measured in the same manner as described above in a state in which the voltage of the liquid crystal cell was turned off. The difference between the initial brightness (L0) measured before driving the liquid crystal cell and the final brightness (L1) measured after driving the liquid cell was divided by the value of the initial brightness (L0) and multiplied by 100, thereby calculating the brightness fluctuation rate. As the calculated brightness fluctuation rate is closer to 0%, it means that the alignment stability is excellent. The level of afterimage was evaluated through the measurement result of such brightness fluctuation rate according the following criteria.

Excellent: brightness fluctuation rate of less than 10%
Ordinary: brightness fluctuation rate of 10% to 20%

4) Imidization Conversion Rate (%)

The FT-IR spectra of the liquid crystal alignment films obtained from the liquid crystal aligning agent compositions of the examples and comparative examples were measured by an ATR method, and the ratio of imide structure in the polymer molecules contained in the alignment film was measured.

TABLE 1

Measurement results of experimental examples for examples and comparative examples

| Category | Polymer | Diamine | Carboxylic anhydride | Alignment properties | VHR (%) | AC after image (%) | Imidization rate (%) |
|---|---|---|---|---|---|---|---|
| Example 1 | P-1 | Preparation Example 1 | CBDA | Good | 95 | Excellent | 95 |
| Example 2 | P-2 | Preparation Example 2 | CBDA | Good | 94 | Excellent | 94 |
| Example 3 | P-3 | Preparation Example 1 | DMCBDA | Good | 94 | Excellent | 96 |
| Example 4 | P-4 | Preparation Example 2 | DMCBDA | Good | 95 | Excellent | 96 |
| Example 5 | P-5 | Preparation Example 1 | BT100 | Good | 97 | Excellent | 99 |
| Example 6 | P-6 | Preparation Example 2 | BT100 | Good | 96 | Ordinary | 98 |
| Comparative Example 1 | R-1 | Chemical Formula A | CBDA | Poor | 78 | Ordinary | 87 |
| Comparative Example 2 | R-2 | Chemical Formula B | CBDA | Good | 97 | Excellent | 90 |

Chemical Formula A: 6-(4-aminophenyl)pyridin-3-amine
Chemical Formula B: 4,4'-diaminodiphenylamine
CBDA: Cyclobutane-1,2,3,4-tetracarboxylic dianhydride
DMCBDA: 1,3-dimethyl cyclobutane-1,2,3,4-tetracarboxylic dianhydride
BT100: tetrahydro-[3,3'-bifuran]-2,2',5,5'-tetraone As shown in Table 1, it was confirmed that the liquid crystal alignment cells obtained by using the polymers synthesized from the diamines having specific structures obtained in Preparation Examples 1 and 2 exhibit excellent alignment and afterimage properties and the voltage holding ratio (VHR) is as high as 94% or more, thereby realizing enhanced electrical characteristics.

In contrast, it was confirmed that the liquid crystal aligning agent of Comparative Example 1 does not contain a diamine having the same structure as Preparation Examples 1 and 2 in the reactant during the preparation of the polymer, and shows a voltage holding ratio (VHR) of 78% which is significantly lower than that of Examples 1-6.

It was confirmed that Comparative Example 2 shows excellent alignment, after-image, and VHR properties but does not contain a diamine having the structure shown in Preparation Examples 1 and 2, and thus shows a relatively low imidization rate of 90% at 230° C. as compared with Examples 1-6.

The invention claimed is:

1. A liquid crystal aligning agent including a polymer comprising at least one selected from the group consisting of a repeating unit represented by Chemical Formula 1, a repeating unit represented by Chemical Formula 2, and a repeating unit represented by Chemical Formula 3:

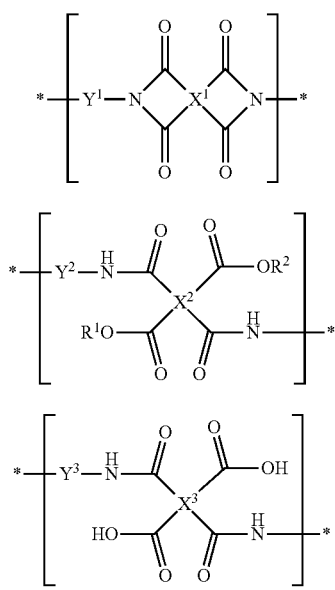

[Chemical Formula 1]

[Chemical Formula 2]

[Chemical Formula 3]

wherein, in Chemical Formulae 1 to 3,
at least one of $R^1$ and $R^2$ is an alkyl group having 1 to 10 carbon atoms and the other is hydrogen, $X^1$ to $X^3$ are each independently a tetravalent organic group, and $Y^1$ to $Y^3$ are each independently a divalent organic group represented by Chemical Formula 4-2,

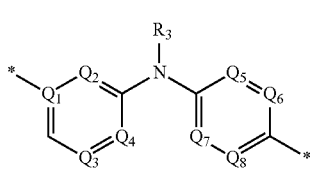

[Chemical Formula 4-2]

wherein, in Chemical Formula 4-2,
at least one of $Q_1$ to $Q_4$ is nitrogen and the rest are carbon,
at least one of $Q_5$ to $Q_8$ is nitrogen and the rest are carbon, and
$R_3$ is hydrogen or an alkyl group having 1 to 6 carbon atoms,
wherein $X^1$ to $X^3$ each independently include a tetravalent organic group represented by the following Chemical Formula 5:

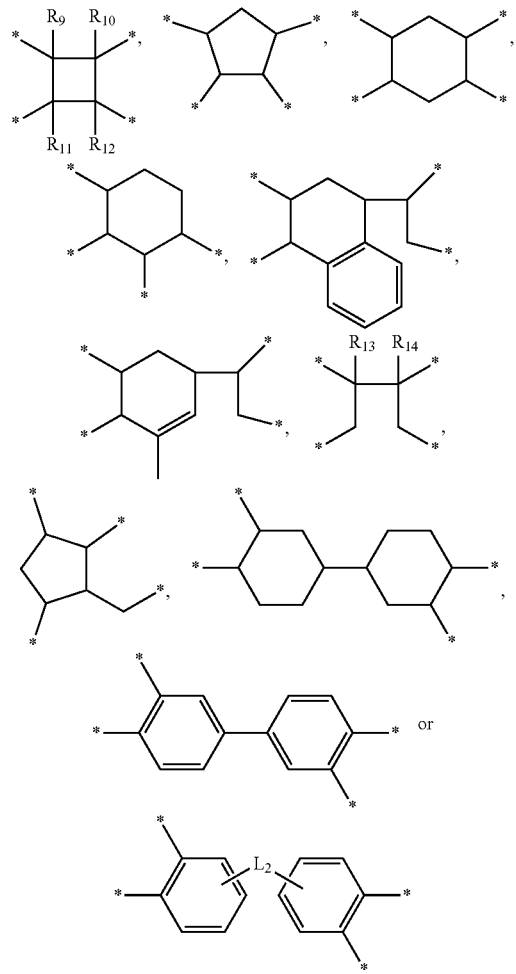

[Chemical Formula 5]

wherein, in Chemical Formula 5,
$R_9$ to $R_{14}$ are each independently hydrogen or an alkyl group having 1 to 10 carbon atoms,
$L_2$ is any one selected from the group consisting of a direct bond, —O—, —S—, —SO—, —SO$_2$—, —CR$_{15}$R$_{16}$—, —CONH—, —COO—, —(CH$_2$)$_b$—, —O(CH$_2$)$_b$O—, —COO—(CH$_2$)$_b$—OCO—, phenylene, and a combination thereof,
$R_{15}$ and $R_{16}$ are each independently hydrogen, an alkyl group having 1 to 10 carbon atoms, or a fluoroalkyl group having 1 to 10 carbon atoms, and b is an integer of 1 to 10.

2. The liquid crystal aligning agent of claim 1, wherein in $Q_1$ to $Q_4$ of the Chemical Formula 4-2, one of $Q_2$ and $Q_4$ is nitrogen and the other is carbon, and $Q_1$ and $Q_3$ are carbon.

3. The liquid crystal aligning agent of claim 1, wherein in $Q_5$ to $Q_8$ of the Chemical Formula 4-2, one of $Q_5$ and $Q_7$ is nitrogen and the other is carbon, and $Q_6$ and $Q_8$ are carbon.

4. The liquid crystal aligning agent of claim 1, wherein in the Chemical Formula 4-2, $R_3$ is hydrogen.

5. The liquid crystal aligning agent of claim 1, wherein the polymer has a weight average molecular weight of 100 g/mol to 200,000 g/mol.

6. A liquid crystal aligning agent coating composition comprising the liquid crystal aligning agent of claim 1.

7. A method for preparing a liquid crystal alignment film comprising steps of:
coating the liquid crystal aligning agent coating composition of claim 6 onto a substrate to form a coating film;
drying the coating film;
irradiating the coating film immediately after the drying step with light or rubbing the coating film to perform alignment treatment; and
heat-treating and curing the alignment-treated coating film.

8. The method for preparing a liquid crystal alignment film of claim 7, wherein the liquid crystal aligning agent coating composition contains an organic solvent in which the polymer is dissolved or dispersed.

9. The method for preparing a liquid crystal alignment film of claim 7, wherein the step of drying the coating film is performed at 50° C. to 150° C.

10. The method for preparing a liquid crystal alignment film of claim 7, wherein in the alignment treatment step, the light irradiation is performed by irradiating polarized ultraviolet rays having a wavelength of 150 nm to 450 nm.

11. The method for preparing a liquid crystal alignment film of claim 7, wherein in the step of curing the coating film, the heat treatment temperature is 150° C. to 300° C.

12. A liquid crystal alignment film prepared by the method for preparing a liquid crystal alignment film of claim 7.

13. A liquid crystal display device comprising the liquid crystal alignment film of claim 12.

14. The liquid crystal aligning agent of claim 1, wherein $X^1$ to $X^3$ are each independently a tetravalent organic group represented by the following Chemical Formula 5-1, Chemical Formula 5-2, or Chemical Formula 5-3:

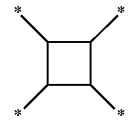

[Chemical Formula 5-1]

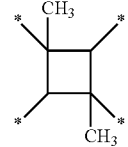

[Chemical Formula 5-2]

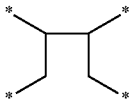

[Chemical Formula 5-3]

* * * * *